US012799780B2

(12) United States Patent
de Omena et al.

(10) Patent No.: US 12,799,780 B2
(45) Date of Patent: Nov. 17, 2026

(54) SERVICE PULL TAB WITH SECURING CLIP AND RIBS

(71) Applicant: Illinois Tool Works Inc., Glenview, IL (US)

(72) Inventors: Laura P. de Omena, Chicago, IL (US); Justin L. Ruzich, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 162 days.

(21) Appl. No.: 18/419,344

(22) Filed: Jan. 22, 2024

(65) Prior Publication Data

US 2024/0247523 A1 Jul. 25, 2024

Related U.S. Application Data

(60) Provisional application No. 63/440,949, filed on Jan. 25, 2023.

(51) Int. Cl.
*E05B 81/90* (2014.01)
*E05B 83/34* (2014.01)

(52) U.S. Cl.
CPC .............. *E05B 81/90* (2013.01); *E05B 83/34* (2013.01)

(58) Field of Classification Search
CPC ........... E05B 83/34; E05B 85/10; E05B 81/90
See application file for complete search history.

(56) References Cited

U.S. PATENT DOCUMENTS 8,317,237 B1 * 11/2012 Fannon .................... E05B 79/20 292/336.5
11,597,270 B2 3/2023 Hegwein et al.
12,509,921 B2 * 12/2025 Ueki ........................ E05B 79/20
(Continued)

FOREIGN PATENT DOCUMENTS

CN 106285243 A * 1/2017 ............. E05B 83/24
CN 206053612 U * 3/2017
(Continued)

OTHER PUBLICATIONS

Espacenet machine translation of CN 206053612 U, generated Sep. 5, 2025. (Year: 2025).*
(Continued)

*Primary Examiner* — Kristina R Fulton
*Assistant Examiner* — Emily G. Brown
(74) *Attorney, Agent, or Firm* — McAndrews, Held & Malloy, Ltd.

(57) ABSTRACT

Disclosed is a pull-release tether for disengaging an actuator. The pull-release tether includes a tether having first and second ends, a fastener assembly, and a pull ring. The second end is coupled with the actuator via, for example, a release mechanism of the actuator. The fastener assembly is coupled to the first end and secures the pull-release tether with an opening formed at operator interface. The pull ring is coupled to the fastener to enable a user to pull the pull-release tether with one finger. In some examples, the fastener assembly comprises a base and a plurality of clips. The plurality of clips includes a first clip and a second clip, each of which is outwardly biased and resiliently connected to the fastener assembly. The base can define a sidewall that forms an interference fit with the opening. For example, the sidewall can comprise a plurality of ribs.

8 Claims, 9 Drawing Sheets

(56) References Cited

U.S. PATENT DOCUMENTS

| | | | | |
|---|---|---|---|---|
| 2003/0180115 | A1* | 9/2003 | Lydan | B60R 13/0206 411/34 |
| 2011/0241360 | A1* | 10/2011 | Kitamura | E05B 81/90 292/201 |
| 2017/0268265 | A1* | 9/2017 | Hiramoto | E05B 83/40 |
| 2017/0328094 | A1* | 11/2017 | Zia | E05B 81/90 |
| 2020/0232499 | A1* | 7/2020 | Rasmus | F16B 37/043 |
| 2022/0307294 | A1* | 9/2022 | Shinoda | E05B 83/34 |
| 2023/0061589 | A1 | 3/2023 | Galinski et al. | |

FOREIGN PATENT DOCUMENTS

| | | | | |
|---|---|---|---|---|
| DE | 102015004985 A1 | * | 12/2015 | E05B 79/22 |
| JP | 5822694 B2 | * | 11/2015 | |

OTHER PUBLICATIONS

Espacenet machine translation of DE 102015004985 A1, generated Sep. 5, 2025. (Year: 2025).*

Espacenet, machine translation of CN106285243A, generated Mar. 18, 2026 (Year: 2026).*

* cited by examiner

SERVICE PULL TAB WITH SECURING CLIP AND RIBS

RELATED APPLICATION

The present application claims priority to U.S. Provisional Patent Application No. 63/440,949, filed Jan. 25, 2023, and entitled "Service Pull Tab with Securing Clip and Ribs," which is hereby incorporated by reference in its entirety.

BACKGROUND

Modern vehicles use a plethora of actuators and other actuating devices to control (e.g., open, closed, release, lock, etc.) covers, doors, and the like. Almost all vehicles are equipped with such actuators, including cars, trucks, buses, train locomotives, watercraft (e.g., those with a cabin) and even some aircraft. For example fuel ports, charge ports, and the like are often controlled by an actuating device. Commonly-owned U.S. Pat. No. 11,597,270 to Hegwein ("Hegwein Patent") describes an actuating device for opening and closing a cover in or on a vehicle on demand and cover with such an actuating device. In the event of power loss and/or malfunction, a manual emergency release can be used to release or otherwise disengage the actuating device. For example, the Hegwein Patent describes emergency unlocking via a release device having a pulling device with a pulling strip comprising a manually actuable actuating end. Despite these advancements, a need exists for a further improved release device.

SUMMARY

The present disclosure relates generally to a release device substantially as illustrated by and described in connection with at least one of the figures, as set forth more completely in the claims. More specifically, to a release device having a tether with a service pull tab at one end and the other end configured to connect to an actuator.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
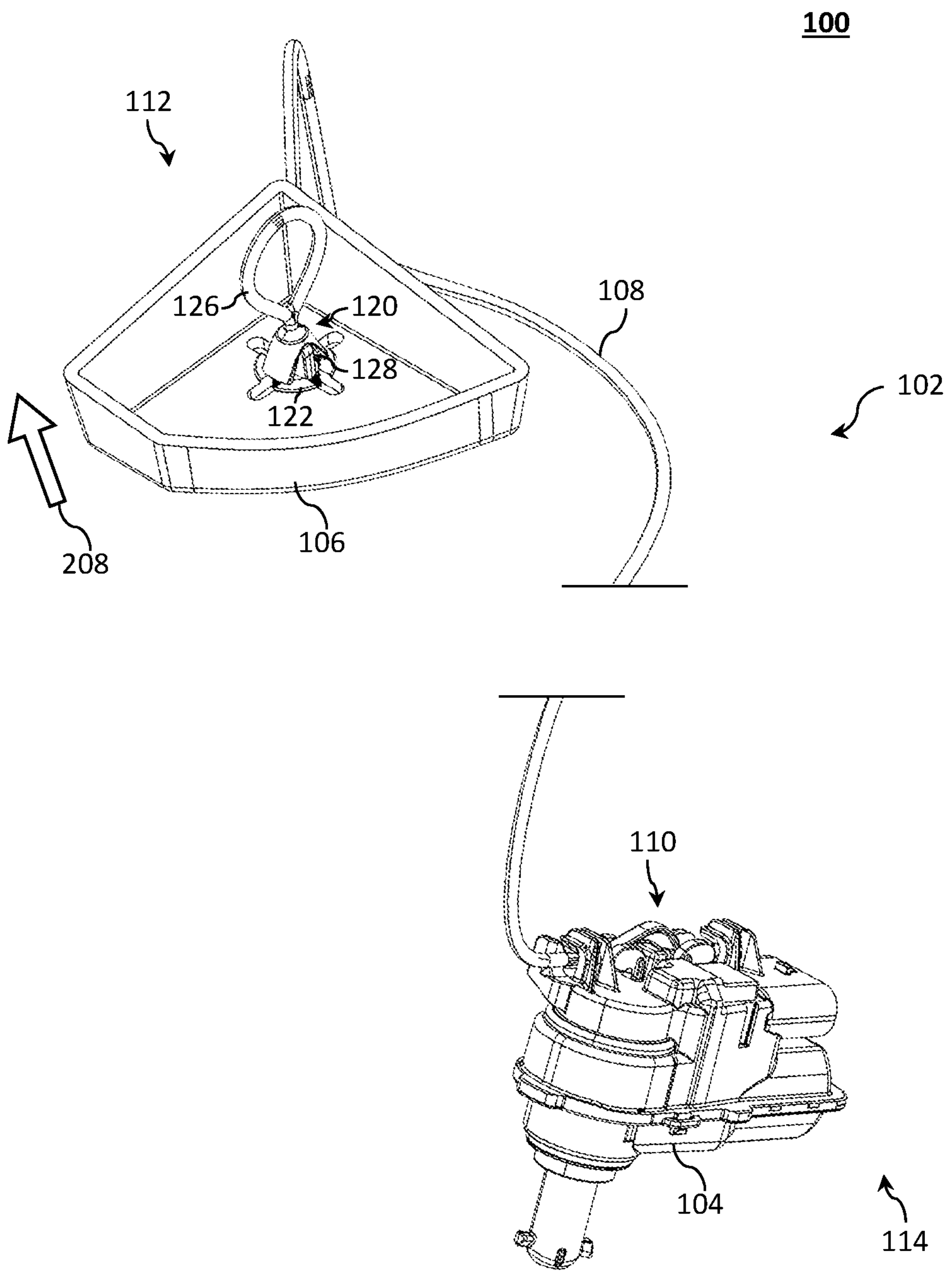
FIGS. 1*a* and 1*b* illustrate, respectively, top and bottom perspective views of an emergency release system in accordance with an aspect of this disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a pull-release tether for use in an emergency release system, such as instances when a vehicle loses power. Generally speaking, the pull-release tether routes an actuator to a mating part to which an operator of the vehicle has access in the event of an emergency. The disclosed pull-release tether address a number of factors, such as maintaining position once installed, mitigating part movement (which can cause rubbing of plastic to produce Buzz, Squeak and Rattle (BSR) during operation of vehicle), simple installation of tether end, and an easy-to-use pull feature for operator. Thus, the disclosed pull-release tether provides an easy one pull attachment method that restricts movement of the tether head, while still maintaining functionality.

In one example, a pull-release tether for disengaging an actuator comprises: a tether having a first end and a second end, wherein the second end is configured to couple with the actuator; a fastener assembly coupled to the first end and configured to couple to an opening formed at operator interface; and a pull ring coupled to the fastener assembly.

In another example, a pull-release tether for disengaging an actuator comprises: a tether having a first end and a second end, the second end configured to couple with the actuator; a fastener assembly coupled to the first end and configured to couple to an opening formed at operator interface, wherein the fastener assembly comprises a retention feature and a base, wherein the base defines a sidewall configured to form an interference fit with the opening; and a pull ring coupled to the fastener assembly.

In yet another example, a pull-release tether for disengaging an actuator comprises: a tether having a first end and a second end, the second end configured to couple with the actuator; a fastener assembly coupled to the first end and configured to couple to an opening formed at operator interface, wherein the fastener assembly comprises a base, a first clip, and a second clip, each of the first clip and the second clip being outwardly biased and resiliently connected to the base via a stem, and wherein the base defines a sidewall configured to form an interference fit with the opening via a plurality of ribs; and a pull ring coupled to the fastener assembly.

In some examples, the tether, the fastener assembly, and the pull ring are a unitary structure.

In some examples, the fastener assembly comprises a base and a plurality of clips.

In some examples, the plurality of clips includes a first clip and a second clip, each of the first clip and the second clip being outwardly biased and resiliently connected to the fastener assembly.

In some examples, the base defines a sidewall configured to form an interference fit with the opening.

In some examples, the sidewall comprises a plurality of ribs.

In some examples, the second end is configured to couple with a release mechanism of the actuator.

In some examples, the second end is configured to couple with a release mechanism of the actuator via a coupling feature.

In some examples, the coupling feature is spherical and integrated with the tether.

In some examples, the tether, the fastener assembly, and the pull ring are a unitary structure formed of a synthetic polymer.

In some examples, the fastener assembly comprises a base and a cap-shaped retention feature.

While often associated with automobiles (e.g., cars, trucks, etc.), emergency release systems for actuators are likewise employed in numerous other vehicles, such as trains, watercraft, and aircraft. Therefore, the following disclosure should not be limited to use in automobiles, but rather would be applicable to emergency release systems and/or actuators used in any type of vehicle.

Figure 1B:
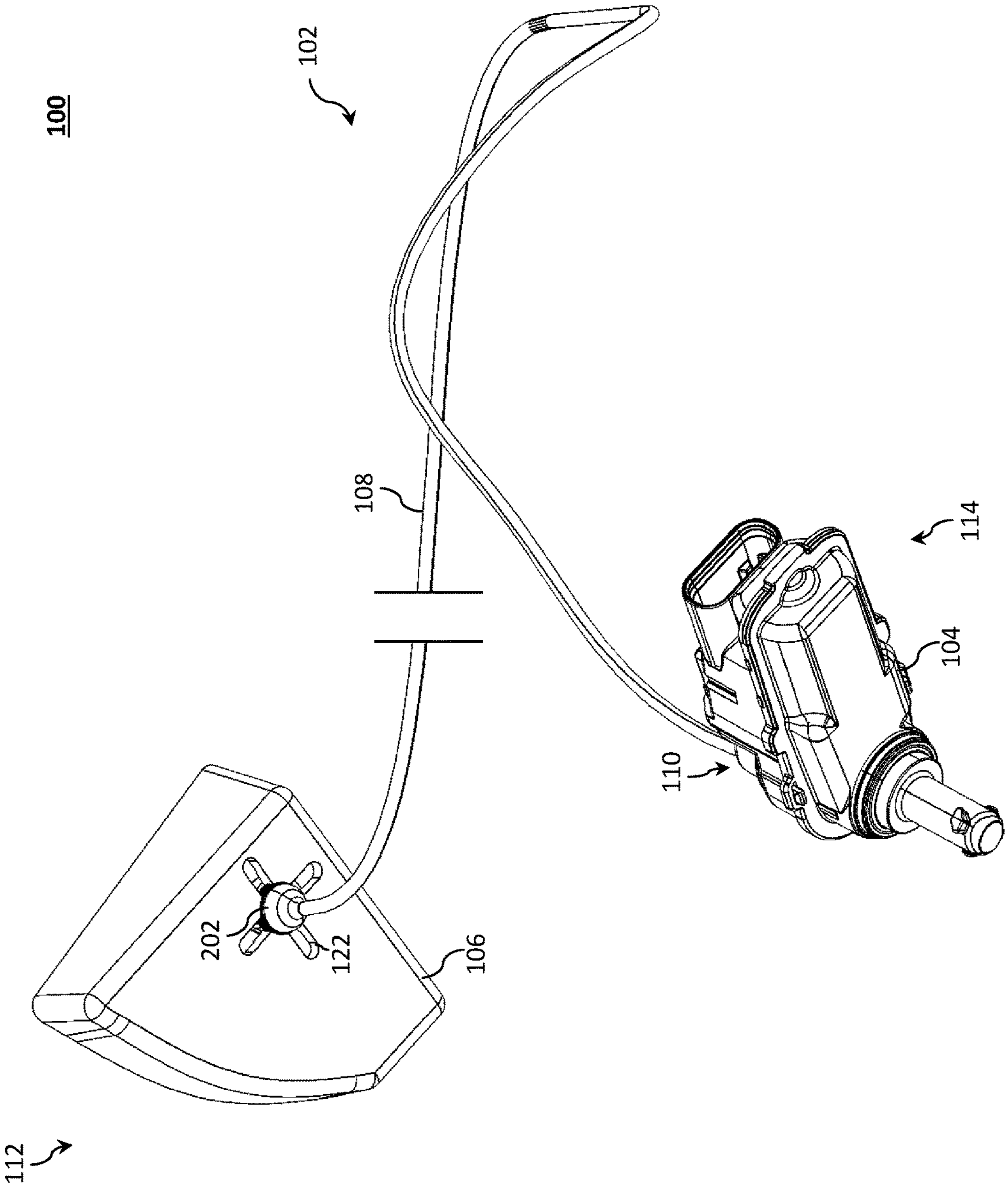

FIGS. 1*a* and 1*b* illustrate, respectively, top and bottom perspective views of an emergency release system 100 in accordance with an aspect of this disclosure. In the illustrated example, the emergency release system 100 generally comprises a pull-release tether 102, and an actuator 104, and a support component 106. The pull-release tether 102 generally comprises a tether 108 that is configured to connect to the actuator 104 via its first end 110 at an operator interface 112 and to the support component 106 via its second end 120 at an actuator interface 114. The actuator interface 114 would typically be positioned proximate the actuator 104, while the operator interface 112 would be remotely situated relative to the actuator interface 114. As can be appreciated, the length of the tether 108 can be adjusted based on the distance between the operator interface 112 and the actuator interface 114.

The first end 110 of the pull-release tether 102 is fixedly coupled to the actuator 104 via a coupling feature 116 at, for example, a release lever of a release mechanism 118. For example, a blocking bar or pin can be pulled via the release leave to release or disengage the actuator 104. The illustrated actuator 104 can be used to control a fuel/charge port door or cover, an example of which is described in greater detail by the Hegwein Patent. While the actuator 104 is illustrated as a release actuator for controlling a fuel/charge port door or cover, the actuator 104 can be any type of actuator where it would be desirable to provide manual release functionality. For example, those used to control and/or release trunks, hoods, doors, hatches, covers (e.g., sensor covers, fuel/charge covers, etc.) and the like.

The support component 106 is configured to secure and retain the second end 120 of the pull-release tether 102. In the illustrated example, the support component 106 defines an opening 122 through which at least a portion of the second end 120 of the pull-release tether 102 passes. In some examples, the opening is 122 is circular (e.g., a round hole). In the illustrated example, the opening 122 further defines a pair of intersecting linear cut outs 124 (e.g., forming an X over the circular hole). The pair of intersecting linear cut outs 124 make it easier to pass at least a portion of the second end 120 by, for example, increasing flexibility of the material at the opening 122. The pair of intersecting linear cut outs 124 also accommodate the pull ring 126 during initial assembly by allowing the pull ring 126 to pass therethrough without overly compressing the pull ring 126.

The support component 106 can be positioned in or on a vehicle at any location where it is desirable provide the operator with an operator interface 112. The operator interface 112 would typically be located in a location that is relatively accessible to the operator when needed (e.g., in the event of power loss, malfunction, or otherwise). In the case of an actuator 104 used to control a fuel/charge port door or cover, the operator interface 112 may be located within the interior of the vehicle at a location that is near the fuel/charge port door or cover to minimize a length of the tether 108. For example, if the fuel/charge port door or cover is positioned at rear driver side of the vehicle, the operator interface 112 could be positioned on the interior side at the very rear driver side of the trunk or cargo area. In the case of an actuator 104 used to control a trunk or boot (at the rear or a vehicle), an operator interface 112 could be located, for example, within the trunk or boot to provide an emergency release in the event of a trapped person.

The support component 106 can be separate from and attached to the vehicle, or integrated with the vehicle. For example, the support component 106 can be attached (bolted, welded, fastened, etc.) to an interior surface of the vehicle body. In another example, the support component 106 can be integrated with the vehicle body. For example, the opening 122 can be cut, punched, or otherwise formed in the vehicle body (e.g., an interior body panel or similar component).

The pull-release tether 102 generally comprises or defines the coupling feature 116 at the first end 110 to attach to the actuator 104 (e.g., via the release mechanism 118), while the second end 120 of the pull-release tether 102 generally comprises or defines a pull ring 126 and a fastener assembly 128. The tether 108, the fastener assembly 128, and the pull ring 126 can be a unitary structure.

The pull ring 126 may be sized and shaped to receive, for example, a human finger to assist when pulling the pull-release tether 102 via the second end 120. The fastener assembly 128 is configured to engage the opening 122 to retain the second end 120 relative to the support component 106. In the illustrated example, the fastener assembly 128 is unidirectional such that the second end 120 can only be pulled in the direction indicated by arrow 208, thus mitigating risk of the second end 120 traveling in the direction opposite that indicated by arrow 208 once installed, which could result in the second end 120 falling into the body of the vehicle. In the illustrated example, the pull ring 126 is coupled to the fastener assemble 128 via a spacer portion 212 (e.g., a neck or stem), which increases the standoff distance of the pull ring 126 and/or flexibility of the pull ring 126 relative to the fastener assembly 128, thus making it easier for the operator to grasp or otherwise engage pull ring 126.

The pull-release tether 102 (or portion thereof) can be made from various materials, including metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. The pull-release tether 102 (or portion thereof) can be elastomeric. In one example, components of the pull-release tether 102 can be fabricated as a single component from a single material. In other examples, however, the pull-release tether 102 can be fabricated as multiple components from one or more materials, where the multiple components are then joined together via, for example, welding, adhesive, mechanical attachments (e.g., via fasteners, knots, crimping), etc. The pull-release tether 102 (or portion thereof) can be fabricated via mold tooling and a plastic-injection molding process. In some examples, portions of the pull-release tether 102 are fabricated via mold tooling and a plastic-injection molding process, while other components are, for example, wire. By way of illustration, the tether 108 could be a wire (e.g., a metal wire), while portion of the first and/or second ends 120, 110 (e.g., the fastener assembly 128, pull ring 126, and/or coupling feature 116) can be fabricated via mold tooling and a plastic-injection molding process. In this example where the tether 108 is a metal wire, the tether 108 can be attached to the fastener assembly 128 and/or pull ring 126 via a hole formed therethrough and one or more crimps.

In another example, components of the pull-release tether 102 can be a printed thermoplastic material component that can be printed with great accuracy and with numerous details, which is particularly advantageous, for example, in creating components requiring complex and/or precise features. In addition, additive manufacturing techniques obviate the need for mold tooling typically associated with plastic injection molding, thereby lowering up-front manufacturing costs, which is particularly advantageous in low-volume productions. In some examples, components of the pull-release tether 102 may be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

Figure 2A:
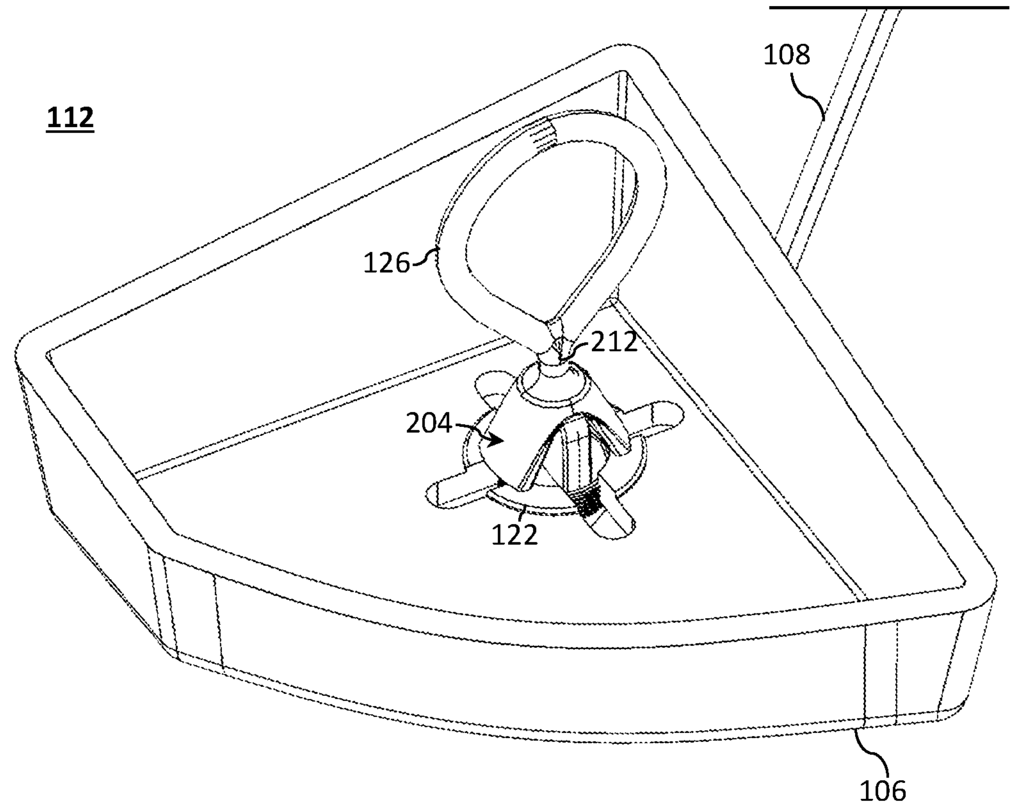
FIGS. 2*a* and 2*b* illustrate topside perspective and top plan views of an operator interface of the emergency release system.
Figure 2B:
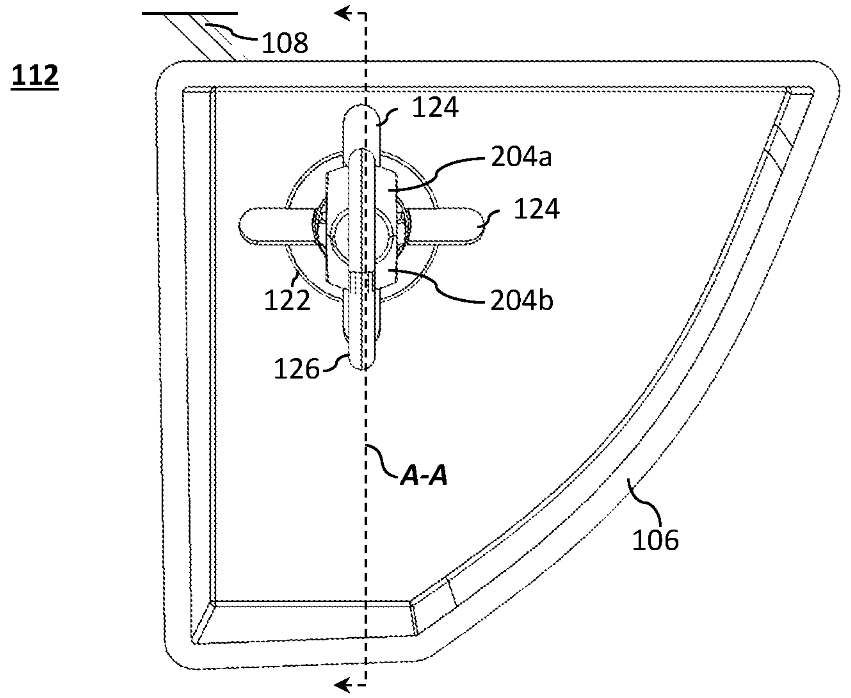
Figure 2C:
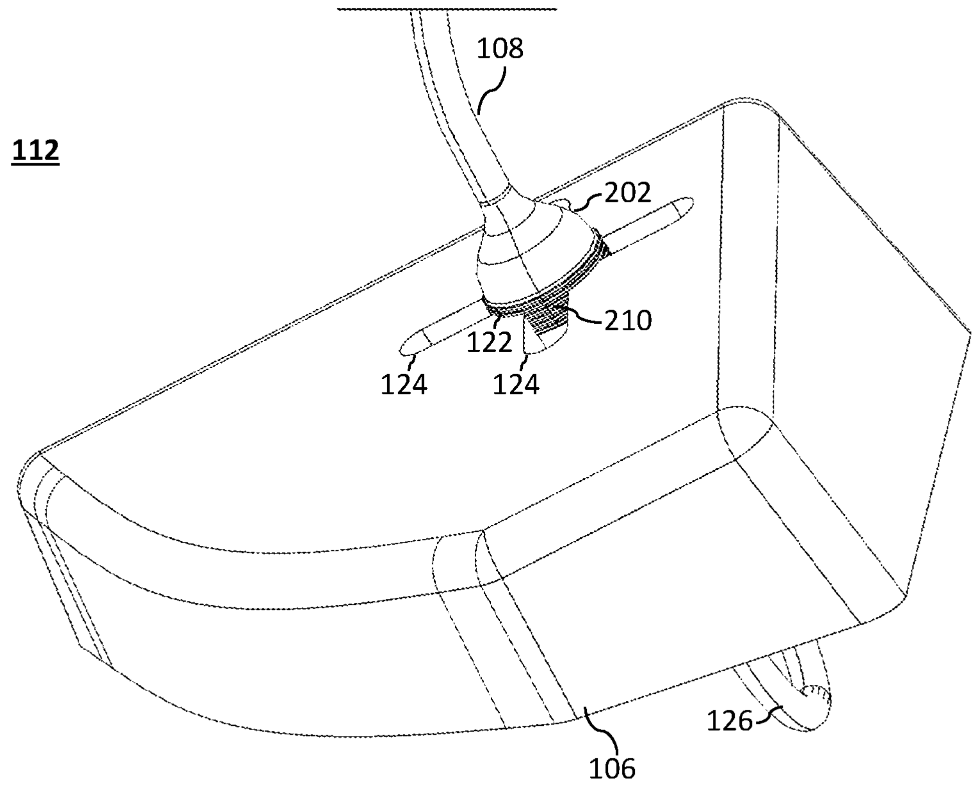
FIGS. 2*c* and 2*d* illustrate underside perspective and bottom plan views of the operator interface.
Figure 2D:
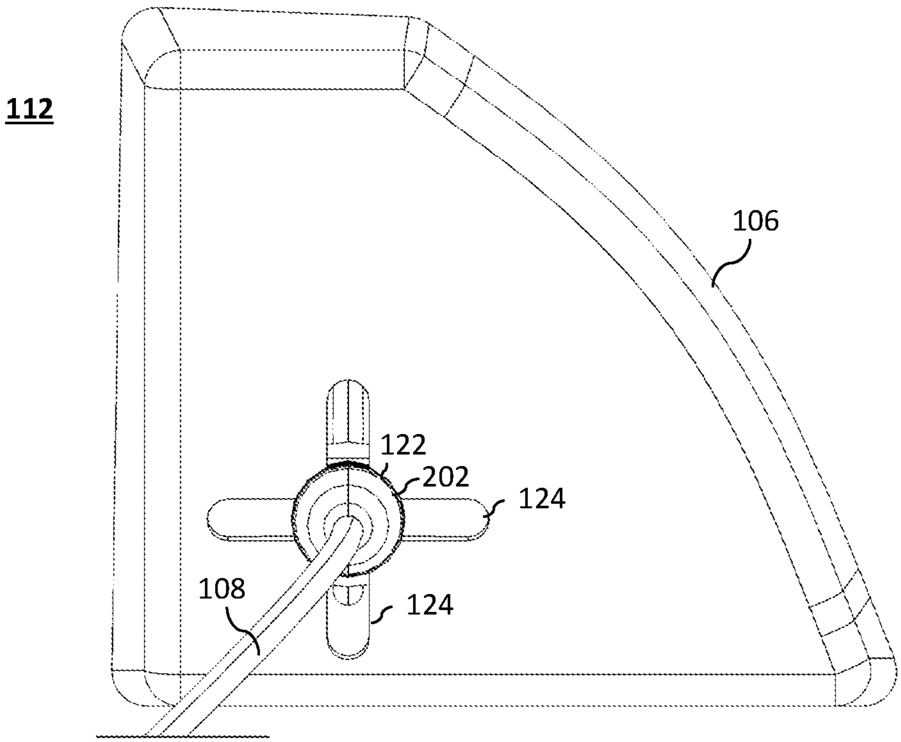
Figure 2E:
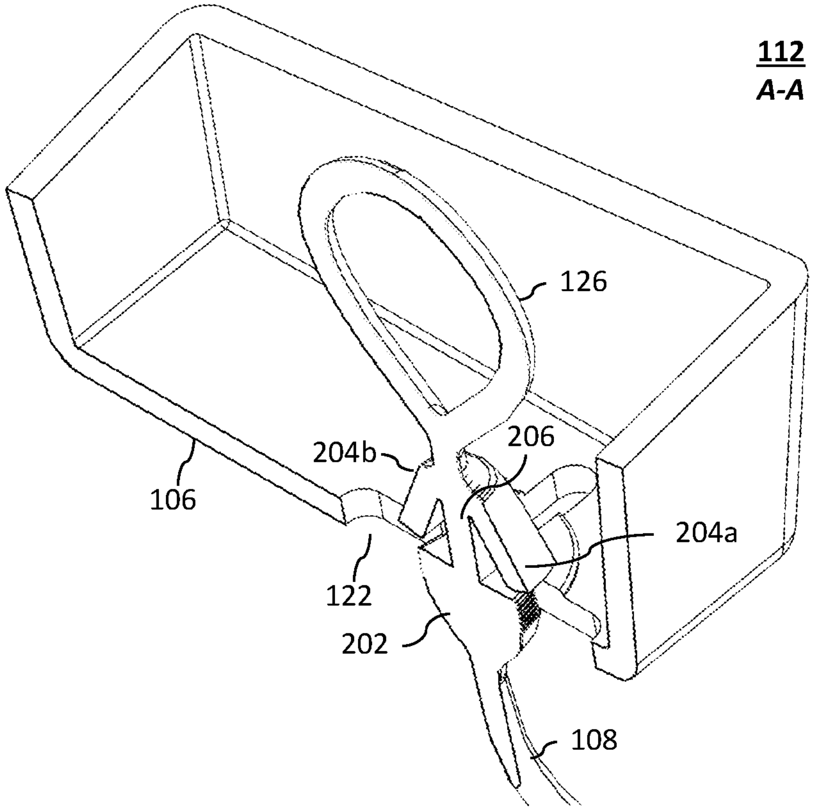
FIGS. 2*e* and 2*f* illustrate cross-sectional perspective and side elevational views of the operator interface taken along cut-line A-A (FIG. 2*a*).
Figure 2F:
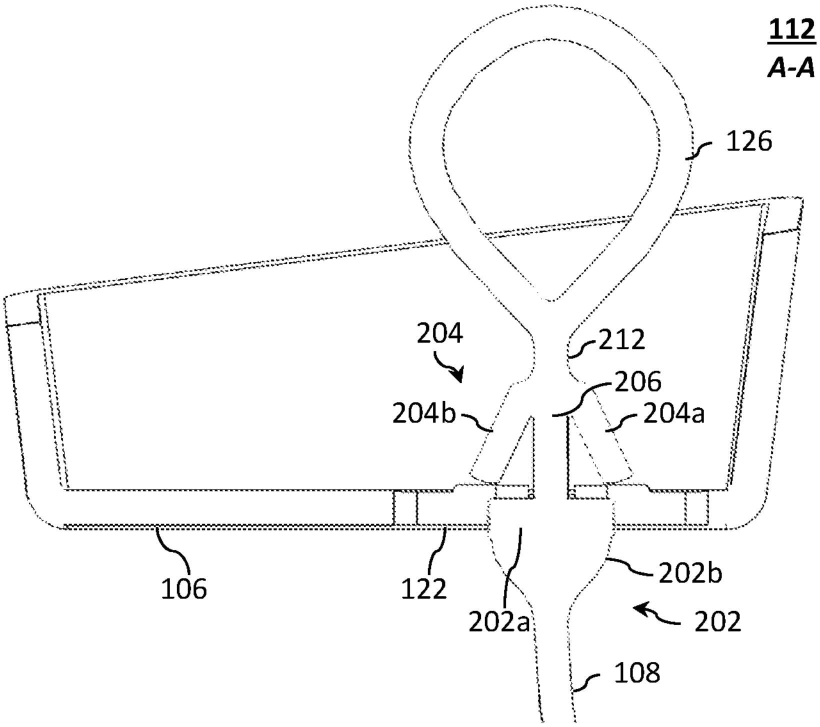
Figure 2G:
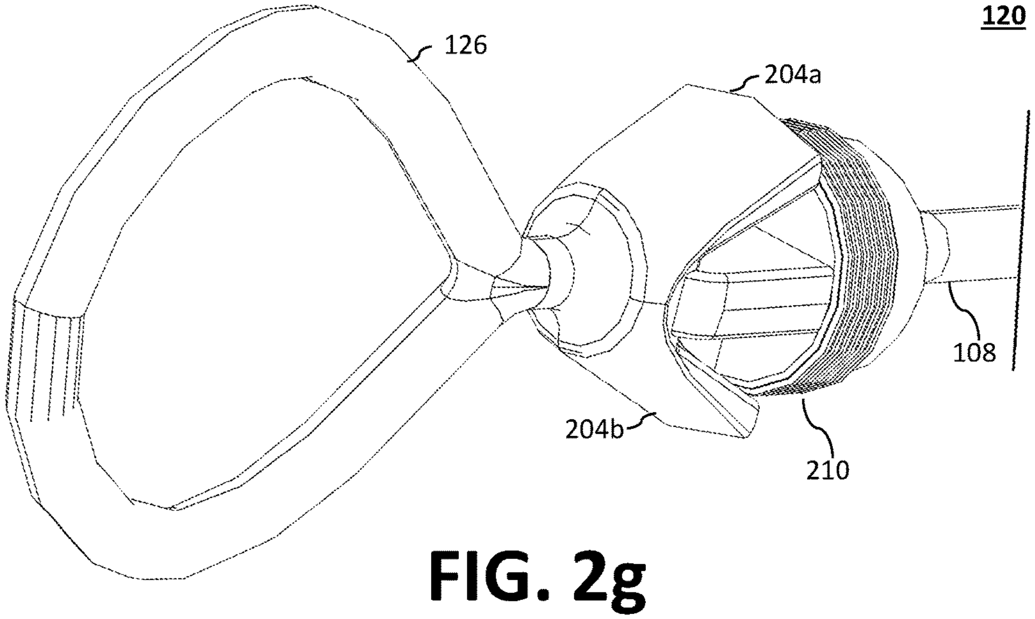
FIG. 2*g* illustrates a perspective view of the second end with the support component omitted.
Figures 2H, 2I, 2J, 2K:
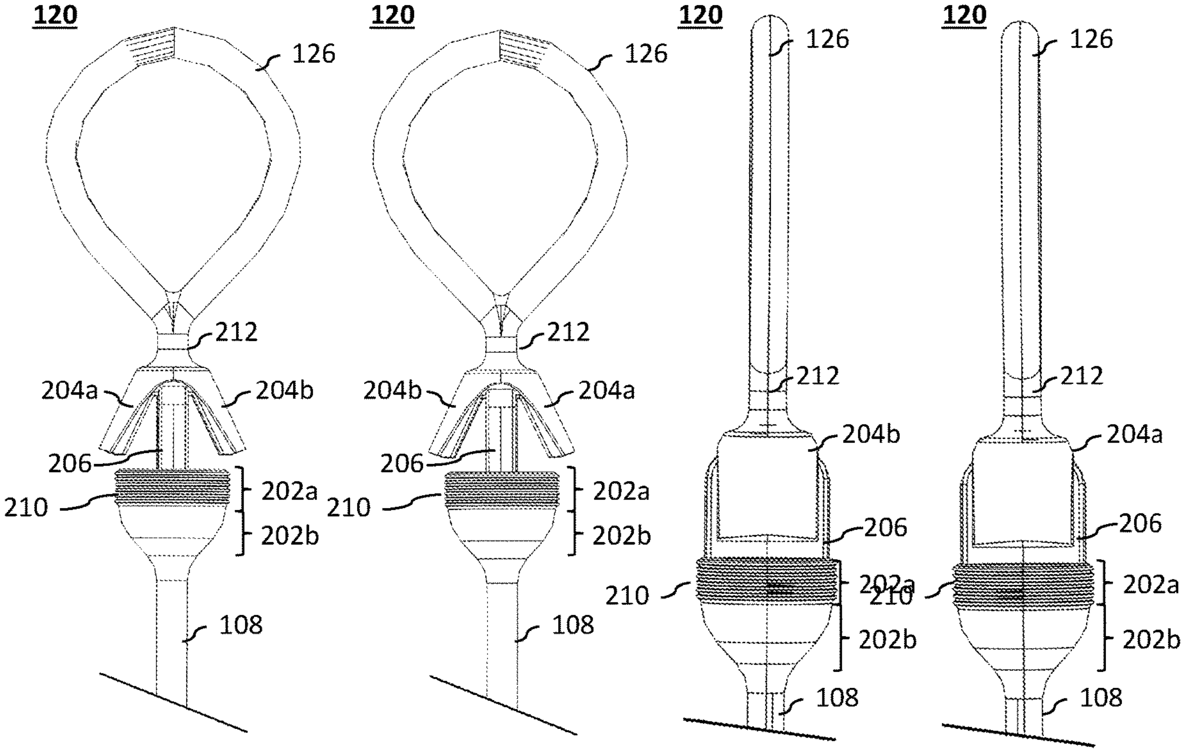
FIG. 2*h* through 2*k* illustrate, respectively, first, second, third, and fourth side views of the second end.

FIGS. 2*a* and 2*b* illustrate topside perspective and top plan views of an operator interface 112 of the emergency release system 100, while FIGS. 2*c* and 2*d* illustrate underside perspective and bottom plan views of the operator interface 112. FIGS. 2*e* and 2*f* illustrate cross-sectional perspective and side elevational views of the operator interface 112 taken along cut-line A-A (FIG. 2*a*). The second end 120 defines, or otherwise includes, the fastener assembly 128, the pull ring 126, and, if applicable, a spacer portion 212. In the illustrated example, the fastener assembly 128 comprises a base 202 and a fastener having a plurality of clips 204 resiliently connected to a stem 206. FIGS. 2*g* through 2*k* illustrate, respectively, perspective, first side, second side, third side, and fourth side views of the second end 120 (with the support component 106 omitted).

The fastener assembly 128 may be secured within the opening 122 via the plurality of clips 204 (illustrated as a set or pair of wings/clips arranged as a "W-type" fastener). The plurality of clips 204 is illustrated with a first clip 20*a* and a second clip 204*b*, each of which is outwardly biased and resiliently connected to the stem 206 of the fastener assembly 128. In this example, two clips 204 are arranged about the central longitudinal axis (e.g., that defined by the stem 206) and spaced from one another by 180 degrees (as best illustrated in FIGS. 2*a* and 2*b*), however, additional clips 204 can be employed. For example, a clip assembly having three or more clips 204 (or other retention features) resiliently coupled to the stem 206. An example fastener assembly having three or more retention features resiliently coupled to the body is described in connection with commonly-owned U.S. Patent No. 2023/0061589 to Galinski. In some examples, a single retention feature can be used instead of a plurality of clips. In some examples, the retention feature generally resembles an umbrella.

Figure 4:
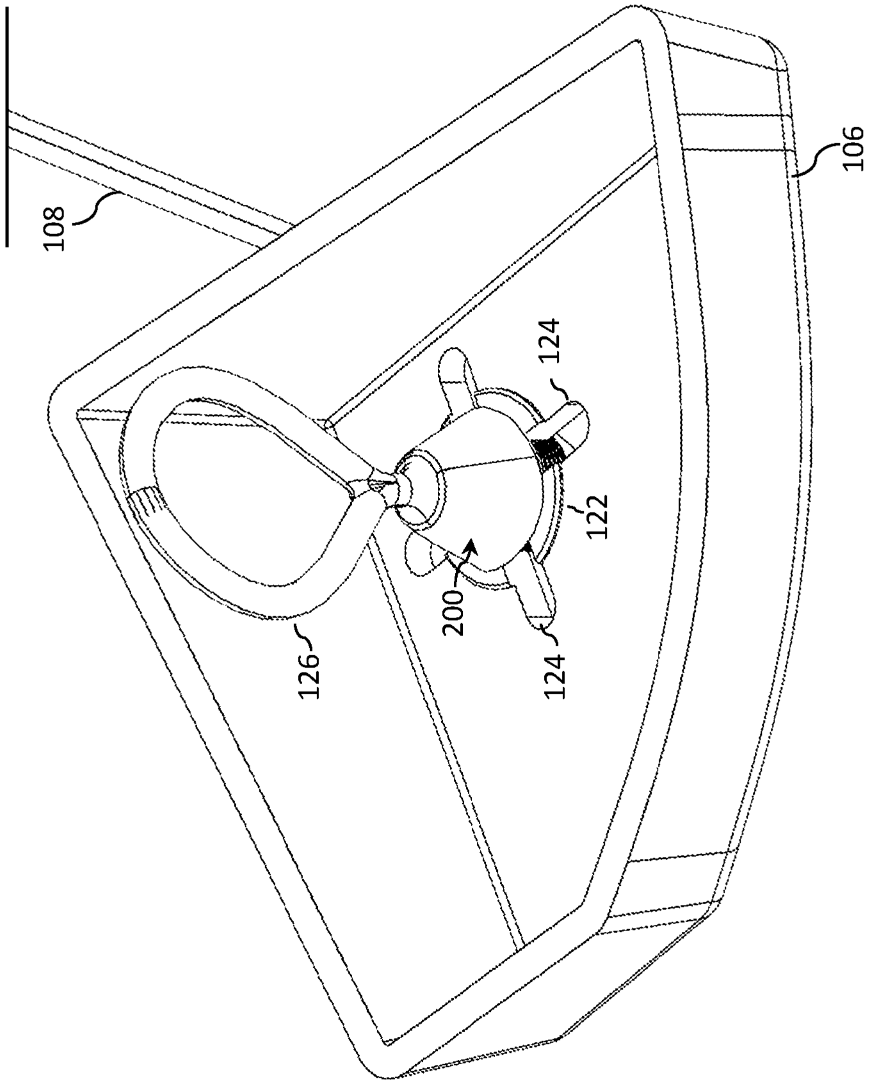
FIG. 4 illustrates a topside perspective view of an operator interface of the emergency release system in accordance with another aspect of this disclosure.

FIG. 4 illustrates a topside perspective view of an operator interface of the emergency release system in accordance with another aspect of this disclosure. For example, as illustrated in FIG. 4, a cap-shaped retention feature 200 (e.g., similar to an umbrella or mushroom cap) can be used. The cap-shaped retention feature 200 can assume one of multiple default shapes, including convex, umbonate, umbilicate, depressed, flat, infundibuliform, campanulate, ovate, or conical.

During assembly, a leading end of the second end 120 is configured to pass through the opening 122 in the direction indicated by arrow 208 such that the plurality of clips 204 are biased via the opening 122 to flex inward to allow the plurality of clips 204 to pass therethrough. For example, the end of the pull ring 126 is pushed through the opening 122 from one side in the direction indicated by arrow 208 and then pulled from the other side via the pull ring 126 in the direction indicated by arrow 208 until the fastener assembly 128 is secured within the opening 122. That is, once the plurality of clips 204 passes through the opening 122, the plurality of clips 204 return to the original position to snap the fastener assembly 128 into place and prevent the second end 120 from going back through the opening 122 once assembled.

The base 202 generally defines a bulbous shape with a cylindrical sidewall, which is configured to grip an interior portion of the opening 122 (e.g., an inner sidewall thereof) via one or more ribs 210 (e.g., ridge, textures, etc.) to increase friction. In the illustrated example, the base 202 comprises a cylindrical portion 202*a* that defines the cylindrical sidewall and a rounded body portion 202*b*. As illustrated, the rounded body portion 202*b* is connected to the tether 108. The rounded body portion 202*b* can be a semi-ovoid (as illustrated), a hemi-sphere, etc.

The base 202 is sized and shaped to provide, together with the one or more ribs 210, an interference fit with the opening 122. In some examples, the size of the base 202 (e.g., the diameter of the cylindrical portion 202*a*) can be slighter larger than the opening 122 to increase the interference fit. In this example, the cylindrical portion 202*a* is elastomeric and/or malleable such that it can be compressed to deform and fit within the opening. The base 202, in effect, retains the fastener assembly 128 within the opening 122, but can be overcome when pulled via the pull ring 126 in the direction indicated by arrow 208.

Figure 3A:
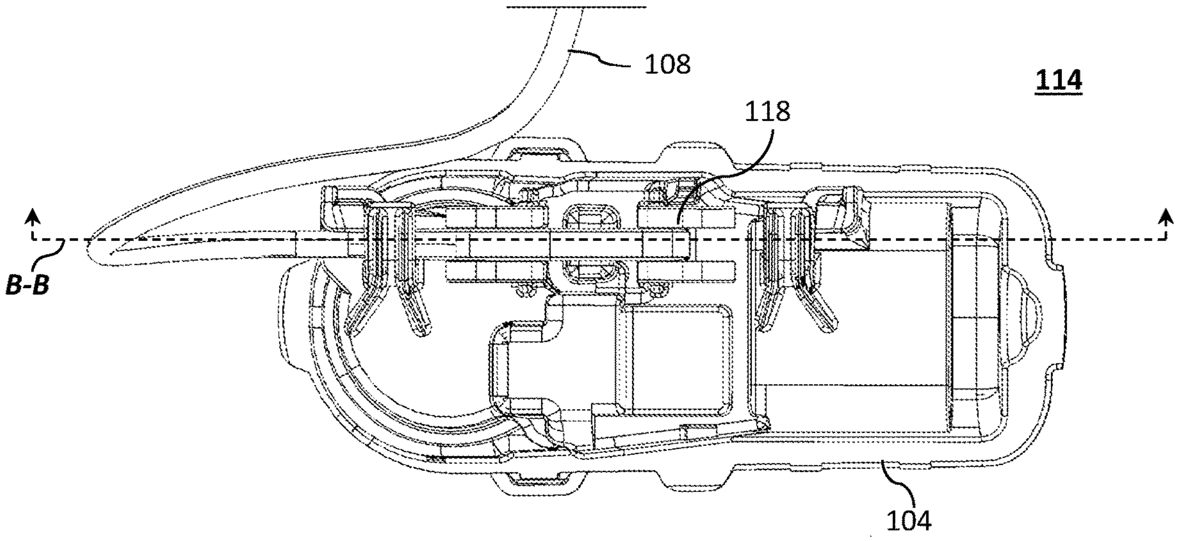
FIG. 3*a* illustrates a top plan view of an actuator interface of the emergency release system.
Figure 3B:
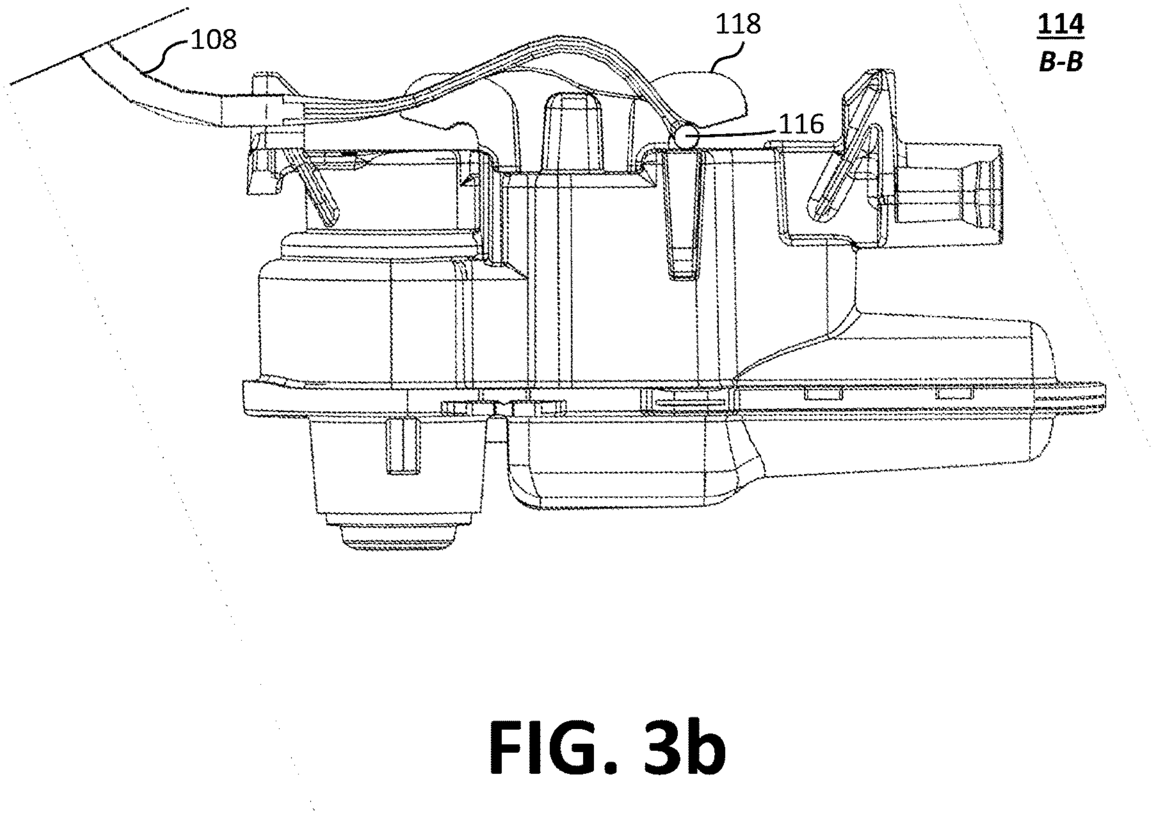
FIG. 3*b* illustrates a cross-sectional side elevational view of the actuator interface taken along cut-line B-B (FIG. 3*a*).
Figure 3C:
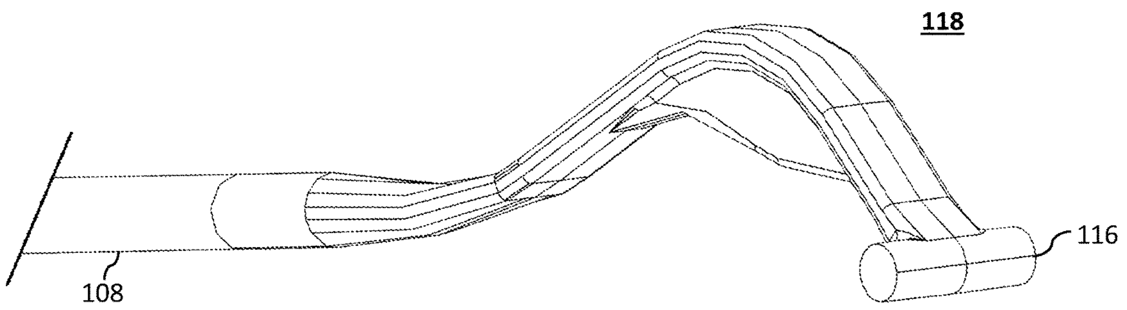
FIG. 3*c* illustrates a perspective view of the first end with the support component omitted.
Figures 3D, 3E, 3F, 3G:
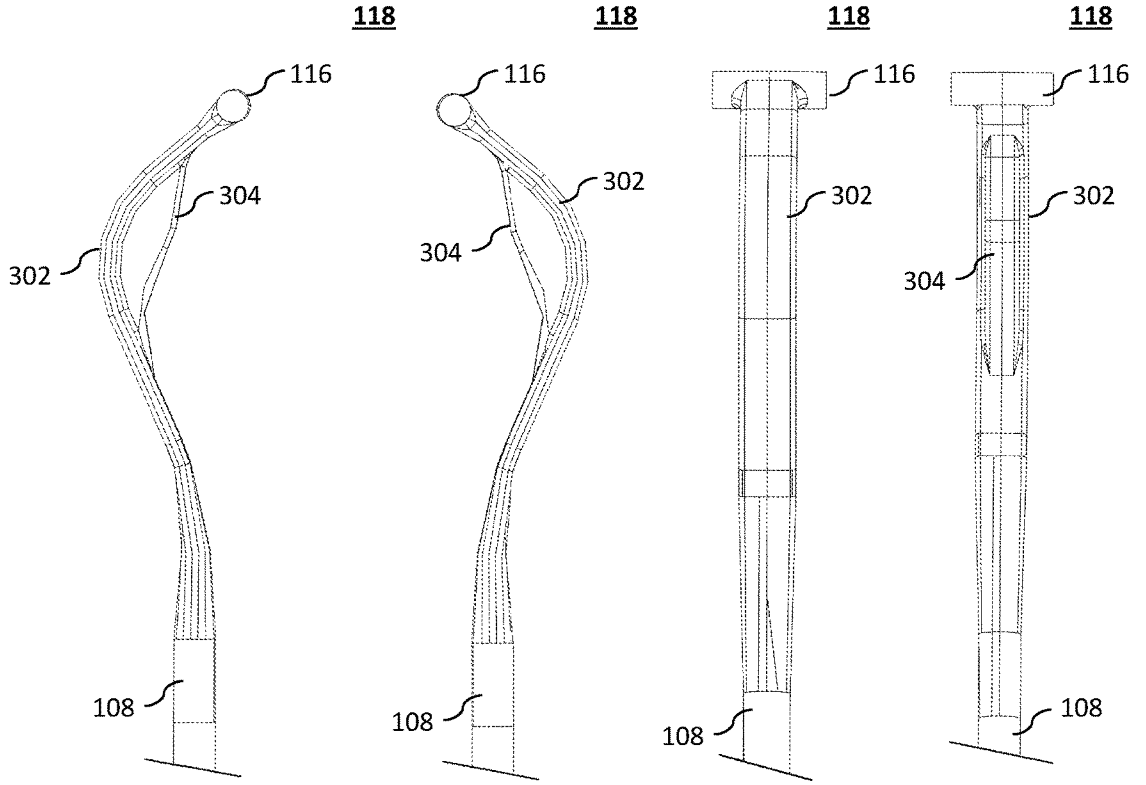
FIG. 3*d* through 3*g* illustrate, respectively, first, second, third, and fourth side views of the second end.

FIG. 3*a* illustrates a top plan view of an actuator interface 114 of the emergency release system 100, while FIG. 3*b* illustrates a cross-sectional side elevation view of the actuator interface 114 taken along cut-line B-B (FIG. 3*a*). As illustrated, the first end 110 of the pull-release tether 102 is fixedly coupled to the actuator 104 via the coupling feature 116 at an end of the tether 108. In some examples, the pull-release tether 102 is coupled to a release lever of a release mechanism 118 that, when pulled, disengages the actuator 104.

FIGS. 3*c* through 3*g* illustrate, respectively, perspective, first side, second side, third side, and fourth side views of the first end 118 (with the actuator 104 omitted). As illustrated the coupling feature 116 may be a linear, spherical, and/or bulbous component that can slip into, for example a slot formed in or on the release mechanism 118. In the illustrated example, the coupling feature 116 is a T-shaped head (i.e., a linear portion, such as a pin, connected to the release tether 102 at a right angle). In some examples, the coupling feature 116 can be connected to the tether 108 via a curved portion 302 that is shaped to compliment or correspond to the shape of the release mechanism 118 (or portion thereof) or a portion of the actuator 104. In some examples, the curved portion 302 comprises or defined a webbing or wall portion 304 to provide rigidity to the curved portion 302 and/or to maintain a shape of the curved portion 302.

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A pull-release tether for disengaging an actuator, the pull-release tether comprising:

a tether having a first end and a second end, the second end configured to couple with the actuator;

a fastener assembly coupled to the first end and configured to couple to an opening formed at operator interface, wherein the fastener assembly comprises a retention feature and a base, wherein the base defines a sidewall configured to form an interference fit with the opening; and a pull ring coupled to the fastener assembly, wherein the tether, the fastener assembly, and the pull ring are a unitary structure.

2. The pull-release tether of claim 1, wherein the retention feature comprises a first clip and a second clip, each of the first clip and the second clip being outwardly biased and resiliently connected to the fastener assembly.

3. The pull-release tether of claim 1, wherein the retention feature comprises a cap-shaped retention feature.

4. The pull-release tether of claim 1, wherein the sidewall comprises a plurality of ribs.

5. The pull-release tether of claim 1, wherein the tether, the fastener assembly, and the pull ring are a unitary structure formed of a synthetic polymer.

6. A pull-release tether for disengaging an actuator, the pull-release tether comprising: a tether having a first end and a second end, the second end configured to couple with the actuator; a fastener assembly coupled to the first end and configured to couple to an opening formed at an operator interface, wherein the fastener assembly comprises a base, a first clip, and a second clip, each of the first clip and the second clip being outwardly biased and resiliently connected to the base via a stem, and wherein the base defines a sidewall configured to form an interference fit with the opening via a plurality of ribs; and a pull ring coupled to the fastener assembly.

7. The pull-release tether of claim 6, wherein the tether, the fastener assembly, and the pull ring are a unitary structure formed of a synthetic polymer.

8. The pull-release tether of claim 6, wherein the pull ring is connected to the fastener assembly via a spacer portion.

* * * * *